(12) United States Patent
Ehle

(10) Patent No.: US 10,686,811 B1
(45) Date of Patent: Jun. 16, 2020

(54) TECHNIQUES FOR CUSTOMER-DERIVED TRAINING OF INTRUSION MANAGEMENT SYSTEMS

(71) Applicant: Amazon Technologies, Inc., Seattle, WA (US)

(72) Inventor: Braxton Chase Ehle, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/550,313

(22) Filed: Nov. 21, 2014

(51) Int. Cl.
*G06F 21/56* (2013.01)
*H04L 29/06* (2006.01)
*G06N 20/00* (2019.01)

(52) U.S. Cl.
CPC ......... *H04L 63/1425* (2013.01); *G06N 20/00* (2019.01)

(58) Field of Classification Search
CPC ............. H04L 63/1425; H04L 63/1408; H04L 63/1483; H04L 63/1441; H04L 63/1433; G06F 21/55; G06F 21/56; G06F 21/566; G06F 21/577; G06F 21/32; G06N 99/005

See application file for complete search history.

(56) References Cited

U.S. PATENT DOCUMENTS

| | | | | |
|---|---|---|---|---|
| 8,402,543 B1* | 3/2013 | Ranjan | ............... | H04L 63/1416 709/223 |
| 2009/0326899 A1* | 12/2009 | Ghorbani | ............ | H04L 63/1433 703/13 |
| 2013/0097706 A1* | 4/2013 | Titonis | .................... | G06F 21/56 726/24 |
| 2014/0090061 A1* | 3/2014 | Avasarala | ............... | G06F 21/56 726/24 |
| 2015/0067853 A1* | 3/2015 | Amrutkar | ............... | H04L 63/14 726/23 |
| 2016/0028753 A1* | 1/2016 | Di Pietro | ............ | H04L 63/1458 726/23 |

* cited by examiner

*Primary Examiner* — Noura Zoubair
(74) *Attorney, Agent, or Firm* — Davis Wright Tremaine LLP

(57) ABSTRACT

Techniques described and suggested herein include various systems and methods for using customer-initiated security tests to generate training data for use in improving detection and mitigation capabilities related network intrusion and data security attacks. Such techniques may include implementing machine learning techniques to refine security models used therewith. For example, customers of a computing resource provider may notify the computing resource provider that a security test is scheduled to occur. In response, in some embodiments, information related to the security test may be used to improve an implemented security model.

20 Claims, 8 Drawing Sheets

TECHNIQUES FOR CUSTOMER-DERIVED TRAINING OF INTRUSION MANAGEMENT SYSTEMS

BACKGROUND

Data and network security are becoming increasingly important, and the considerations related thereto become increasingly complex, in tandem with ever-increasing network traffic and other data movement. The variety, complexity, and severity of data and network security-related attacks are growing at an unprecedented pace, and mitigation thereof is quickly becoming an onerous task. Techniques for detecting and mitigating data and network security-related attacks are varied, and often involve heuristics applied to transiting data in order to determine whether a given quantum of network traffic appears to originate from, e.g., an attack intended to disrupt network security. However, such heuristics rely on and are developed using synthesized data and, in many instances, have difficulty when being tasked with assessing live data, which may be considerably less predictable.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include various systems and methods for using customer-initiated security tests to generate training data for use in improving the detection and mitigation capabilities of network traffic profilers, such as those implementing machine learning techniques to refine security models used therewith. For example, customers, such as those of a computing resource service provider, may utilize resources of the computing resource service provider to conduct security tests and, in some embodiments, inform the computing resource service provider of the time, extent, and nature of such tests. The computing resource service provider may configure a network traffic profiler to monitor the security tests in a fashion that is sensitive to the parameters, as may be partly or wholly provided by the customer (e.g., through its associated customer entities), of the monitored security tests. Such monitoring may include detection of specific types of attack or threat patterns in, for example, network traffic resulting from the security tests.

In some embodiments, the computing resource provider (and in some cases, the network traffic profiler itself) processes the provided parameters to determine a set of expected results for the monitoring period (and, by extension, the security tests). In some embodiments, the expected results are compared with the actual results, and the outcome of the comparison is used to modify the security model used by the network traffic profiler. In some embodiments, one or both of the expected results or the actual results are also compared against a plurality of attack classifications known to the network traffic profiler. To the extent that a match occurs, e.g., between the actual results as monitored and the known attack classifications, the security model may be updated to increase the level of confidence attributable to that attack classification, e.g., for future determinations or monitoring. If there is a mismatch, or no match, in some embodiments, a workflow for further supervised machine learning may be initiated, and the results are synthesized into training data for input into the network traffic profiler, and thereby, the security model.

Figure 1:
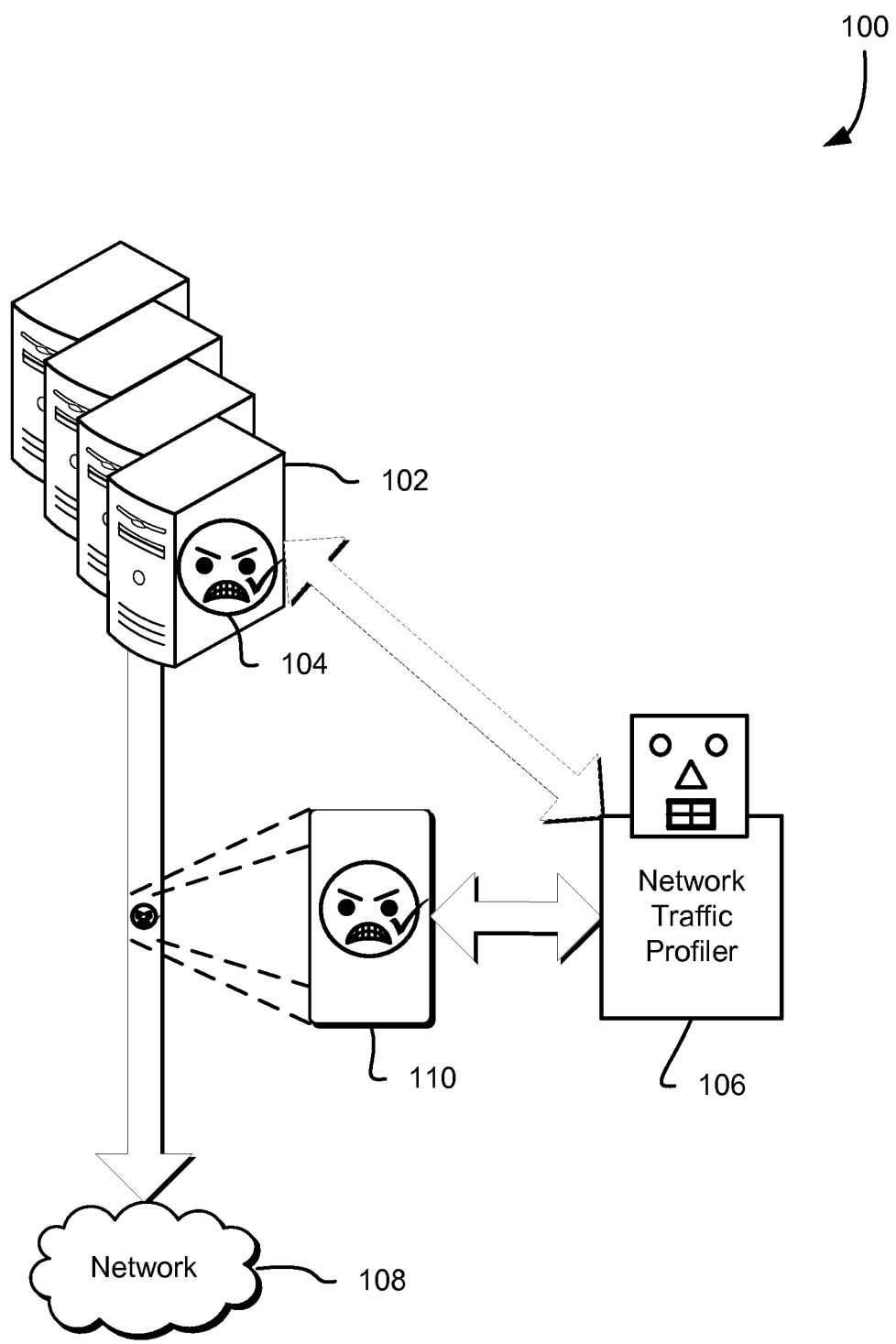
FIG. 1 schematically illustrates a generalized workflow for training a network traffic profiler using customer-sourced information, in accordance with some embodiments.

FIG. 1 schematically illustrates a generalized work flow for training a network traffic profiler using customer-sourced information, in accordance with some embodiments. A client 102, such as a client device of a computing resource service provider, may be configured to conduct a security test with a known attack signature 104. The client 102, in some embodiments, may provide information relating to the security test and the known attack signature 104, to a network traffic profiler 106. The network traffic profiler 106 is configured, in some embodiments, to observe traffic originating from the client 102 to a destination on a network 108. When a traffic profile 110 is recognized in network traffic transiting from the client 102 to the network 108, the network traffic profiler 106 may attempt to directly mitigate the perceived attack, or in some instances, may initiate an external workflow for mitigating the potential attack.

The client 102 may be any entity capable of connecting to the network 108 and generating data across or to the network 108. For example, the client 102 may be a physical computing entity such as a server or workstation, a virtual computer system of a computing resource service provider, a smart phone or other mobile device, or the like. The attack signature 104 is, in some embodiments, one or more parameters that, when observed collectively, are characteristic of an attack on data security for network security. For example, one such attack may be a distributed denial of service attack (DDoS). For distributed denial of service attacks, the attacks signature parameters may include a greater homogeneity of data packet or network traffic type, a spike in throughput to a specific subset of hypertext transfer protocol (HTTP) ports, and the like. Such parameters, as well as the overall attack signature, may be known to the client 102 and communicated to the network traffic profiler 106. In some embodiments, a network traffic profiler 106 may be associated with a plurality of attack classifications that correlate with various attack signatures known to the network traffic profiler 106. In some embodiments, the client may be a virtual computer system, such as one provided by a computing resource service provider. The client may be under direct or indirect control of a customer, such as of the computing resource service provider, and may be controlled programmatically (such as through an application programming interface (API)).

The network traffic profiler 106 may, in some embodiments, be any computing entity capable of monitoring network traffic and, in certain embodiments, may implement one or more machine learning techniques to update and or define one or more security models used to process the raw information derived from monitoring the network traffic. For example, a network traffic profiler 106 implementing such machine learning techniques may ingest a traffic profile 110 as training data to update a security model associated therewith, and, in some embodiments, refine, add, remove, and/or otherwise update one or more attack classifications to which the traffic profile may apply. The network traffic profiler 106 may, in some embodiments, be a router, a network processor, a firewall, a physical computing entity such as a server, a virtual computer system, such as that of a computing resource service provider, and the like.

The network 108 may be any network to which the client 102 is capable of connecting. For example, the network may be the Internet, one or more intranets, a wide area network, a mobile network, or the like. As previously mentioned, data transiting from and/or between the client 102 and an end point on the network 108 may be monitored by the network traffic profiler 106. Certain aspects of the transiting data may be formulated into a traffic profile 110, such as by the network traffic profiler 106. The traffic profile 110 provides a summary of a quantum of network traffic, and such a quantum may be of any length and/or duration as befits the specific implementation. For example, a traffic profile may include information related to a source IP, destination IP, source port, destination port, network protocol used, the amount of traffic sent within the quantum, and the like. The traffic profile 110 may be further analyzed by the network traffic profiler 106 to determine whether it, or a plurality of such traffic profiles in combination, matches the parameters associated with one or more attack classifications to which the network traffic profiler 106 has access. By so doing, in some embodiments, the network traffic profiler 106 may assess whether, and in some embodiments the confidence for which, the traffic profiles may be correlated with an attack or other threat to data or network security.

As previously mentioned, the network traffic profiler 106 may use machine learning techniques and/or algorithms to improve the security model(s) it implements to assess and monitor traffic flowing between the client 102 and the network 108. Such techniques may include supervised learning algorihms (such as binary classification), unsupervisied learning algorithms, semi-supervised learning algorithms, transduction or transductive inference algorithms, reinforcement learning algorithms, inductive bias algorithms, developmental learning algorithms, and the like. While this disclosure focuses on supervised learning techniques, and in particular binary classification techniques, other machine learning techniques are contemplated hereby as in scope of the techniques suggested herein.

A customer, such as a through a customer entity, as previously mentioned, may inform the network traffic profiler 106 of an upcoming or scheduled security test in which a client 102 is to participate. Such security tests may be conducted for purposes other than to update or train the network traffic profiler 106. For example, security tests may include penetration tests. Security tests may be used by customers to simulate malicious behavior sent to end points, such as information systems, that may be located on or outside of the network 108 on which the client 102 resides. The customer may conduct security tests, such as penetration tests, to identify and address security weaknesses within client related systems. A customer may provide, to network traffic profiler 106, various parameters or attributes related to the scheduled security test. For example, such attributes related to the security test may include an identification such as a unique identifier of a source entity (such as an originating client), an identification such as a unique identifier of a destination entity for the security test traffic, a start time for the security test, an end time for the security test, information related to the type of testing to be conducted, and/or one or more known attack signatures 104 expected to be transmitted.

At a time after receiving such information related to a scheduled security test, the network traffic profiler 106 is configured to monitor traffic, such as outbound traffic, in accordance with the parameters and attributes received from the customer (e.g., through client 102, as indicated by the dashed arrow) regarding the security test. In some embodiments, as previously discussed, the network traffic profiler 106 may determine one or more traffic profiles from the monitored network traffic. Such traffic profiles may, in some embodiments, be compared by the network traffic profiler 106 against one or more attack classifications of a security model used by the network traffic profiler 106, and/or one or more known or expected attack signatures derived from the security test related information provided by the client 102. If there is a match between the traffic profile 110 and one of the attack classifications associated with the network traffic profiler 106 and its associated security model, the attack classification to which the traffic profile applies may, using the machine learning techniques previously described, be updated by the network traffic profiler 106 to indicate a greater confidence that the attack classification is effective when applied by the security model.

In some embodiments, if there is no match or a partial match between the traffic profile and the attack classifications, the network traffic profiler 106 initiates a detection improvement workflow to, for example, generate a new attack classification for use by the network traffic profiler and its security model in future monitoring activities. The detection improvement workflow may be automated, manually performed, or some combination thereof. The detection improvement workflow may, in some embodiments, include determining the attack signature of associated with the traffic profile 110 that was unable to be matched by the network traffic profiler 106. In some embodiments, the network traffic resulting from the security test is indistinguishable or at least substantially similar to an actual data or network security attack being simulated. Therefore, it may be contemplated that in embodiments when advance notification and sufficient supporting information related to the security test is provided to a network traffic profiler implementing machine learning techniques, the precision, efficacy, accuracy, and adaptability of the security model implemented therewith may be enhanced relative to a similar system only using synthesized or artificial data for training purposes.

Figure 2:
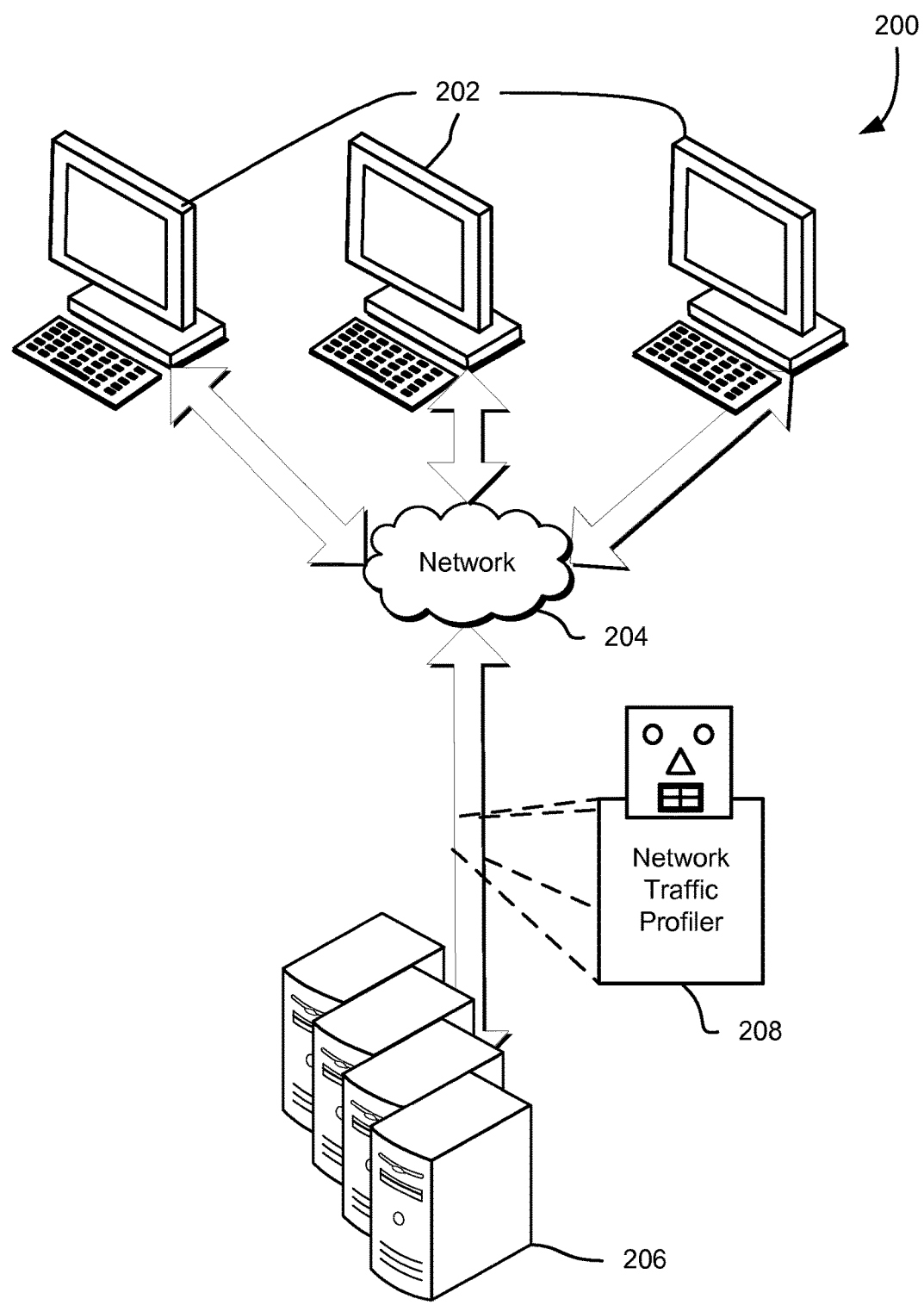
FIG. 2 schematically illustrates an environment implementing a network traffic profiler, in accordance with some embodiments.

FIG. 2 schematically illustrates an environment implementing a network traffic profiler, in accordance with some embodiments. Customer entities 202 connect through network 204 to one or more resources of a computing resource service provider 206. A network traffic profiler 208 is configurable to monitor and/or analyze network traffic transiting between customer entities 202 and the resources of the computing resource service provider 206. The customer entities 202 may include any computing entities associated with a customer, such as a customer of the computing resource service provider 206. For example, customer entities may include physical servers, workstations, mobile devices, network processors and other network-attached devices, virtual computer systems, such as those associated with resources of the computing resource service provider 206, and the like. In some embodiments, customer entities 202 may be similar, or include functionality of, the clients 102 described above in connection with FIG. 1. The network 204 may, in some embodiments, be similar in implementation and functionality to the network 108 described above in connection with FIG. 1. For example, the network may be the Internet, one or more intranets, wireless networks, wide area networks, and the like.

The computing resource service provider 206 may be implemented such that it is capable of, upon request, allocating hardware resources thereof to virtual computer systems, which are programmatically creatable and/or manageable by a requester, such as a customer entity 202. It is contemplated that while a customer/provider relationship is discussed herein for illustrative purposes, the techniques described are applicable to other relationships amongst and between computing entities, such as enterprise environments, business intelligence systems (such as those using automated computing entities to determine metrics related to data stored to other systems connected therewith), and the like.

The computing resource service provider 206 may provide a variety of services to the customer entities 202, and the customer entities 202 may communicate with the computing resource service provider 206 via an interface, which may be a web services interface or any other type of customer interface, such as an application programming interface (API). As illustrated, the customer entities 202 may communicate with the computing resource service provider 206 through the network 204, whereby the network 204 may be a communication network, such as the Internet, and intranet, or an internet service provider (ISP) network. Some communications from the customer entity 202 to the computing resource service provider 206 may cause the computing resource service provider 206 to operate in accordance with one or more embodiments described herein, or a variation thereof.

The computing resource service provider 206 may provide various computing resource services to its customers, such as customer entities 202. The services provided by the computing resource service provider 206 may include a virtual computer system service, a notification service, an authentication system, and/or one or more other services. It is noted that not all embodiments described herein include the services described in connection with this FIG. 2, and it is contemplated that additional services may be provided in addition to, or as an alternative to, services explicitly described herein. As described herein, each of the services may include one or more web service interfaces that enable the customer entities 202 to submit appropriately configured API calls to the various services through web service requests. In addition, each of the services may include one or more service interfaces that enable the services to access each other.

The virtual computer system service may be a collection of computing resources configured to instantiate virtual machine instances on behalf of the customer entity 202. The customer entity 202 may interact with the virtual computer system service (via appropriately configured and authenticated API calls) to provision and operate virtual computer systems that are instantiated on physical computing devices hosted and operated by the computing resource service provider 206. The virtual computer systems may be used for various purposes, such as to operate as servers supporting a website, to operate business applications or, generally, to service computing power for the customer. Other applications for the virtual computer systems may be to support database applications, electronic commerce applications, business applications, and/or other applications. Although the virtual computer system services described herein focus on the use of virtualization or instantiation, any other computer system or computer system service may be utilized in the computing resource service provider 206, such as a computer system or computer system service that does not employ virtualization or instantiation and instead provisions computing resources on dedicated or shared computers/servers and/or physical devices.

In some embodiments, the computing resource service provider 206 may include a notification service. The notification service may comprise a collection of computing resources collectively configured to provide a web service or other interface and browser-based management console. The management console can be used to configure topics for which customers seek to receive notifications, configure applications, subscribe clients to the topics, publish messages, or configure delivery of the messages over a client's protocol of choice (i.e., hypertext transfer protocol) (HTTP), email, short message service (SMS), and the like). The notification service may provide notifications to clients using a "push" mechanism without the need to periodically check or "poll" for new information and updates. The notification service may further be used for various purposes, such as monitoring applications executing in the virtual computer system service, workflow systems, time-sensitive information updates, mobile applications, and many others.

The computing resource service provider 206, in some embodiments, includes an authentication system and a policy management service. The authentication system, in an embodiment, is a computer system (i.e., collection of computing resources) configured to perform operations involved in authentication of users of the customer. For instance, one of the services described herein may provide information from a user to the authentication service to receive information in return that indicates whether or not the user requests are authentic. In some embodiments, the policy management service is a computer system configured to manage policies on behalf of customers and customer entities (such as customer entities 202) of the computing resource service provider 206. The policy management service may include an interface that enables customers to submit requests related to the management of policy. Such requests may, for instance, be requests to add, delete, change or otherwise modify policy for a customer or for other administrative actions, such as providing an inventory of existing policies and the like.

The computing resource service provider 206 may additionally maintain one or more services other than that described herein based at least in part on the needs of its customers, such as customer entities 202. For instance, the computing resource service provider 206 may maintain a database service for its customers. A database service may be a collection of computing resources that collectively operate to run one or more databases for one or more customers. In some embodiments, the customer entities 202 may operate and manage such a database from the database service by utilizing appropriately configured API calls. This, in turn, may allow a customer, such as the customer entities 202, to maintain and potentially scale the operations in the database. Other services include, but are not limited to, object level archival data storage services, services that manage and/or monitor other services, task services, on-demand data storage services, cryptography services, block-level data storage services, and many others.

The network traffic profiler 208 may, in some embodiments, be provided as an additional service of the computing resource service provider 206. In some embodiments, the network traffic profiler 208 may be implemented or derived from one or more of the other services provided by computing resource service provider 206, such as the services described above. For example, the network traffic profiler 208 may be a virtual computer system, such as that provided by a virtual computer system service provided by the computing resource service provider 206. The network traffic profiler 208 may, in a fashion similar to other virtual computer systems described herein, be instantiated by a customer entity 202, or, in some embodiments, may be instantiated or created internally, such as by another service of the computing resource service provider 206. In some embodiments, the network traffic profiler may be a discrete computing entity, such as a server or plurality of servers, a network appliance, such as a router, a firewall device and the like. In some embodiments, the network traffic profiler may take an action described herein in any fashion consistent with its implementation. For example, the network traffic profiler may be caused to monitor the security test, perform traffic profile analysis, and the like, by an API call of a service or other process, such as that of a computing resource service provider, and, in some cases, a customer entity.

The network traffic profiler 208 may, in some embodiments, be capable of using machine learning techniques to improve one or more security models used by the network traffic profiler 208 to inspect and process network traffic that it is monitoring. Such machine learning techniques may include supervised learning techniques, unsupervised learning techniques, semi-supervised learning techniques, transduction or transductive inference techniques, reinforcement learning, developmental learning, and the like. While this disclosure focuses on the use of supervised learning techniques, such as binary classification, other types of machine learning techniques are contemplated hereby as within scope.

The security model may, in some embodiments, use a data-driven algorithm, or plurality of algorithms, that are capable of determining a type of threat of network traffic being monitored, as well as a confidence level of that determination. The data-driven algorithm or plurality of algorithms may be similar in implementation to the various techniques described throughout this disclosure, e.g., in connection with FIGS. 5 and 6 below. Such determinations made by the security model may, in some embodiments, be utilized to determine and/or analyze past threats, current threats, and/or, in some embodiments, may be predictive of future threats. In some embodiments, the greater the amount of data, such as training data, provided to the security model, the greater the accuracy, and the higher the confidence, of determinations made by/through the security model. Such determinations may be persisted as attack classifications, which, in some embodiments, include various example patterns of attributes that are associated with different types of traffic and/or attacks. Such attack classifications may be stored locally to the entity implementing the traffic profiler, or, in some embodiments, may be stored in a separate entity to which the network traffic profiler has access. For example, the attack classifications may be stored using an on-demand data storage service provided by the computing resource service provider 206.

Figure 3:
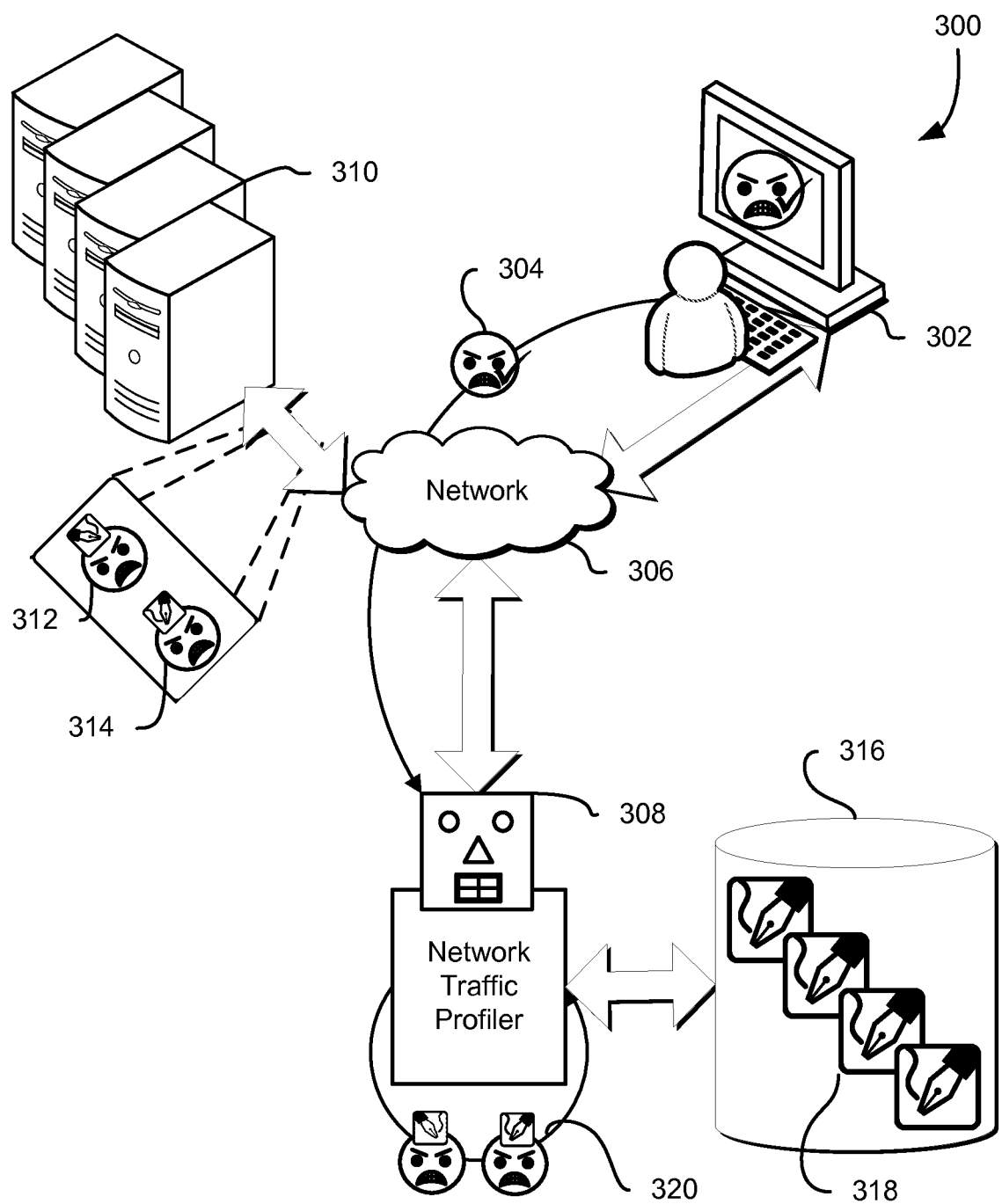
FIG. 3 schematically illustrates workflows related to updating a network traffic profiler's detection model using client-initiated security tests, in accordance with some embodiments.

FIG. 3 schematically illustrates workflows related to updating a network traffic profiler's detection model using client-initiated security tests, in accordance with some embodiments. A customer entity 302 may, in some embodiments, submit a notification of a security test 304, directly or indirectly, such as through network 306, to network traffic profiler 308. The customer entity 302 may be similar in implementation and functionality to at least customer entities 202 described above in connection with FIG. 2. The security test notification 304 may include information related to the scheduled security test. For example, the notification may include a start time, an end time, a duration (or some combination of a start time, end time, and duration), an identification of the intended source entity on which the security test will originate, an identification of an end point (i.e., destination entity) intended to receive the network traffic resulting from the security test, an identity of the customer entity or client submitting the request, the type of security test intended to be performed, and so on. The identification of the source entity may be a unique source identifier capable of uniquely identifying the identity of the source. For example, a source identifier may include an Internet Protocol (IP) address such as an IPv4 or IPv6 address, a fully qualified domain name, host name or other identifier, and so on.

A source entity may be any entity that the network traffic profiler 308 is capable of monitoring network traffic flowing therefrom. For example, a source entity may be a virtual computer system of a computing resource service provider, such as one provided by a virtual computer service provided by the computing resource service provider 206 described above in connection with FIG. 2. While such virtual computer systems are a focus of the present disclosure, it is contemplated that any other entity capable of being the source of the security test, and to which the network profiler has direct or indirect network access, may be used. For example, source entities may include physical servers, network processors such as routers and other network-attached devices, dedicated security devices such as network security devices, agglomerations of computing entities such as simulated bot nets, and the like. Furthermore, the source entity may, in some embodiments, be a customer entity, such as the customer entity 302. In some of such embodiments, the source entity may be the same entity as the customer entity. Furthermore, the destination entity may, in some embodiments, be a customer entity, such as the customer entity 302. In some of such embodiments, the destination entity may be the same entity as the customer entity.

The destination entity associated with the notification of the security test 304 may, in some embodiments, be a virtual computer system provided by a computing resource service provider, according to various techniques described herein.

A destination entity may be any end point capable of receiving network traffic arising from a security test, such as would be initiated upon the source entity. It is contemplated that the destination entity may, similarly to the source entity, include one or more of virtual computer systems, physical servers, workstations, mobile devices, network processors and other network-attached appliances, customer entities, such as the customer entity 302, and the like. In some embodiments, the destination entity is within a network boundary that includes the computing resource service provider 310, the network traffic profiler 308, and the like. In some embodiments, the destination entity may be an end point that is outside of such a network boundary, such as a customer entity 302 or other entity within a customer's control. The source entity and destination entity may be located, both from a physical and/or a topological (i.e., network topology) perspective, such that the network traffic profiler 308 may monitor the network traffic traveling therebetween.

The security test 304 may be any test that simulates a data security or network security attack, such as a distributed denial of service (DDoS) attack. While DDoS attacks are a focus of the present disclosure, any other type of data security or network security attacks that are simulated may be simulated thereby. In some embodiments, a customer entity 302 submits information pertaining to a scheduled security test 304 to network traffic profiler 308. Such notification may include various attributes related to the security test, such as the parameters previously described. At a time after receiving this notification, the network traffic profiler is configured, in some embodiments, using at least some of the attributes or other information related to the security test as contained or associated with the notification. For example, the network traffic profiler may be configured to monitor and analyze network activity between a source entity identified by a source identifier in the notification, to a destination entity identified by a target identifier in the notification for a length of time specified in the notification during which the security test will be run. As a further example, the network traffic profiler may determine, based on various environmental parameters, such as an operating system or other attributes of either the source entity or the destination entity, an expected type of traffic attributable to the security test.

In embodiments where the notification includes a test type identifier for the security test, the network traffic profiler may be further configured to focus or otherwise listen for network traffic associated with a security test, such as a simulated attack, of the type identified by the test type identifier. In some embodiments, at a time after the security test begins, various network traffic flows from the source entity to the destination entity in accordance with the parameters of the security test. In some embodiments, the network traffic profiler 308 may identify traffic profiles 312 and 314 within the monitored network traffic.

In some embodiments, the traffic profiles may match, partly or entirely, various known attack classifications 318, associated with a security model implemented by the network traffic profiler 308. Such attack classifications 318 may include identifications of traffic patterns such as patterns in various attributes of network traffic, that are indicative of a given network or data security attack. Such attack classifications may be generated manually, in an automated fashion, such as by using machine learning techniques, and the like. For example, the attack classifications 318 may include templates or examples of various network traffic, location, or data signatures of the attack types they represent, as well as detection parameters that correlate with a threat, confidence, or probability level that the represented attack is occurring or has occurred. The attack classifications 318 may be stored or otherwise memorialized on a data store 316 that is accessible to network traffic profiler 308. Such a data store may, for example, be instantiated using a service of the computing resource service provider, such as an on-demand data storage service. While traffic outbound from a source entity to a destination entity is a focus of this disclosure, both inbound and outbound traffic may be assessed utilizing the techniques described herein.

In embodiments where the network traffic profiler determines that a traffic profile 314 matches an attack classification 318 to which it has access, the network traffic profiler may utilize a feedback loop to improve the matching attack classification 318. Such a feedback loop may utilize machine learning techniques, as previously described. For example, if the traffic profile 314 matches one of the attack classifications 318, the network traffic profiler may thereby classify the traffic profile as a successful match, and thereby increase the confidence attributable to that attack classification 318. For future matching purposes, the attack classification with the increased confidence may provide a better or more accurate match to other similar traffic profiles.

In some embodiments, if the traffic profile 312 is not appropriately matched to any attack classification 318, the feedback loop 320 may incorporate machine learning techniques to automatically (e.g., through an application programming interface call or other automated fashion) add an attack classification for future matching use. In some embodiments, the network traffic profiler may initiate a detection improvement workflow that, when completed, generates a new attack classification that matches the traffic profile. The detection improvement work flow may be an automated process (e.g., in the form of an application programming interface call, a web service call, or an internal process such as one implementing various machine learning techniques), or in some embodiments may be entirely or partially manually performed. Such a work flow may include investigation as to why the network traffic profiler was unable to match the traffic profile 312 to any known attack classification 318, the manual or automatic creation of a new attack classification, adjustment of existing attack classifications that should have matched the traffic profile 312, and other such actions.

Figure 4:
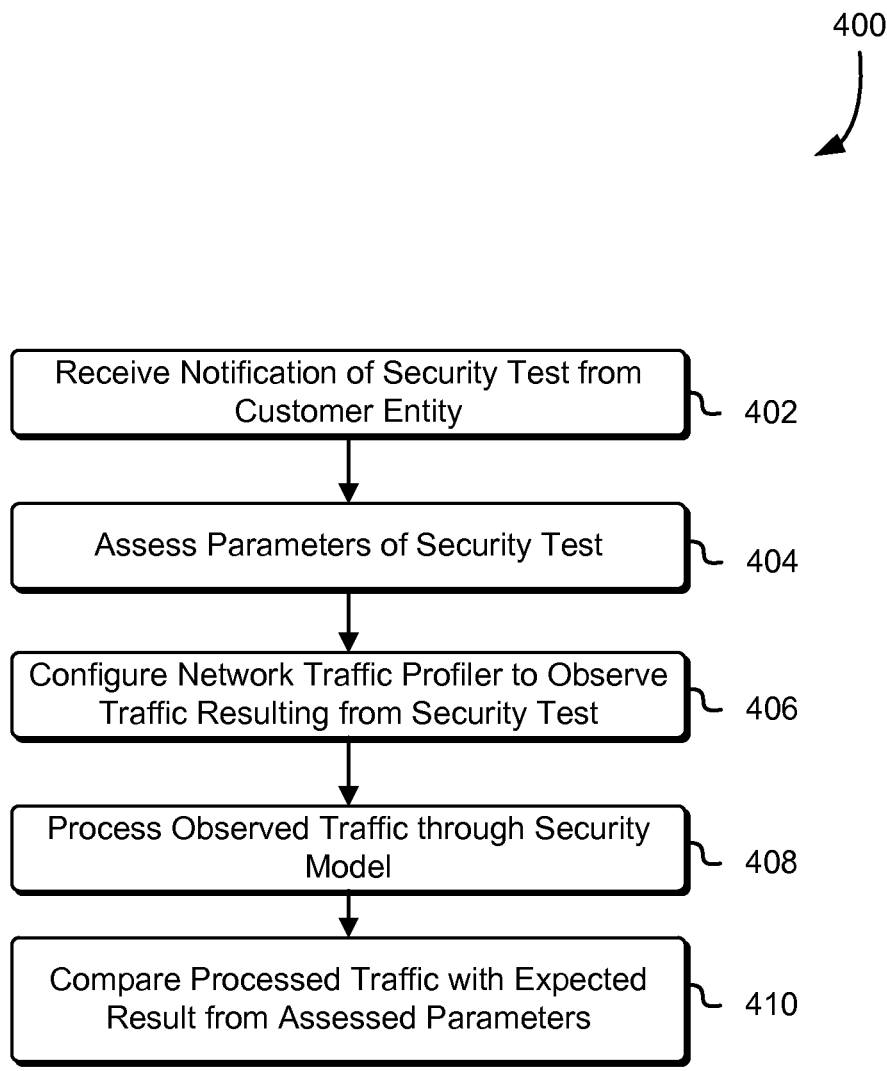
FIG. 4 illustrates an example process for configuring a system to train a network traffic profiler using security tests initiated by customers, in accordance with some embodiments.

FIG. 4 illustrates an example process 400 for configuring a system to train a network traffic profiler in using security tests of clients, in accordance with some embodiments. The process 400 may be performed or implemented by one of various components described in further detail in this disclosure, such as a network traffic profiler 106, 208 or 308 described above in connection with at least FIGS. 1, 2 and 3, respectively. At step 402, an entity, such as a network traffic profiler, receives notification of a security test from a customer entity. As previously described, a customer entity may be similar to a customer 202 or 302, described above in connection with at least FIGS. 2 and 3, respectively. Additionally, a customer entity may be a client, such as a client entity of a computing and resource service provider 102.

As previously described above, the notification of the security test may include various attributes or parameters for the security test to be run. Also as previously described, the security test may be of a type previously described, such as a penetration test. At step 404, an entity, such as a network traffic profiler, assesses the parameters of the security test for which it received a notification. As previously described, the parameters of the security test may be derived from the notification, or information associated therewith. In step 406, an entity such as a network traffic profiler is configured to observe network traffic resulting from the security test. For example, the network traffic profiler may use the assessed parameters of the security test so as to specifically listen for network traffic between a source entity and a destination entity of the security test, as defined in the notification received from the customer entity.

At step 408, the observed traffic is processed by the network traffic profiler using, for example, a security model, such as a security model as previously described in connection with at least FIGS. 1 through 3, is implemented so as to at least generate one or more traffic profiles associated with the observed traffic. The traffic profiles may each relate to a given quantum of network traffic, or, in some embodiments, may relate to an amount of network traffic that the network traffic profiler determines to potentially be related to a data or network security attack (or other malicious traffic). At step 410, the processed traffic, such as the traffic profile, is compared by an entity, such as a network traffic profiler, with expected or predetermined results based on, for example, the security test parameters assessed in connection with Step 404. For example, the network traffic profiler may compare the traffic profiles, using a security model, with one or more attack classifications to which the network traffic profiler has access. The attack classifications may be similar to those previously described in connection with at least FIGS. 1 through 3.

Figure 5:
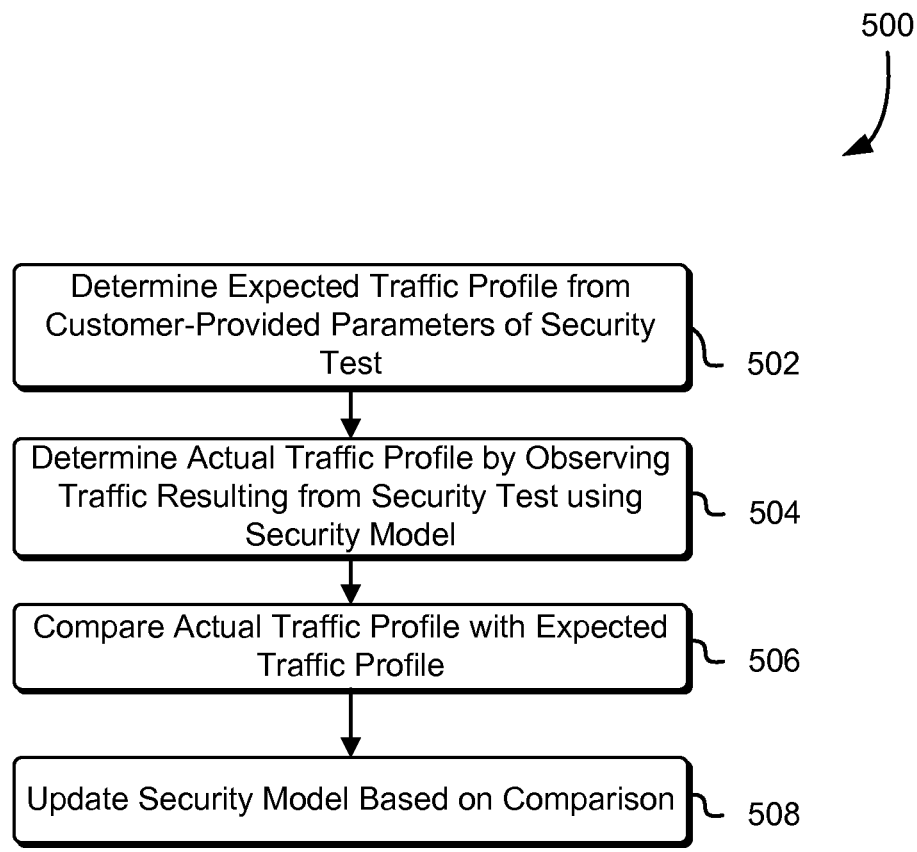
FIG. 5 illustrates an example process for using traffic profiles derived from customer-initiated security tests to assess the efficacy of and update security models, in accordance with some embodiments.

FIG. 5 illustrates an example process 500 for using traffic profiles derived from customer-initiated security tests to assess the efficacy of security models, in accordance with some embodiments. Process 500 may be implemented using, for example, a network traffic profiler, such as the network traffic profiler 106, 208 and 308 described above in connection with FIGS. 1 through 3. Certain aspects of process 500 may, in the alternative or in addition, be performed by various services associated with a computing and resource service provider, such as the computing and resource service provider 206 described above in connection with at least FIG. 2.

At step 502, an entity, such as a network traffic profiler, determines an expected traffic profiler from customer-provided parameters of a customer-initiated security test. In some embodiments, the determination may be performed manually, such as by a customer, and thereby provided in conjunction with a notification provided to, for example, a network traffic profiler, of a scheduled security test. The traffic profile, security test parameters, and security test may be similar to the traffic profiles, security test parameters, and security test described above in connection with at least FIGS. 1 through 4.

At step 504, an entity, such as a network traffic profiler, determines one or more actual traffic profiles by observing network traffic resulting from a security test underway, using, for example, a security model associated with the network traffic profiler. At step 506, an entity, such as the network traffic profiler, compares the determined actual traffic profiles to the expected traffic profiles determined in connection with step 502, described above. Such a comparison may be made with, for example, attack classifications that are associated with the security model implemented by the network traffic profiler. As previously discussed, an expected traffic profile may be partly or entirely calculated based on the customer-provided parameters associated with the security test. For example, the expected traffic profile may differ based on an operating system specified for one or both of the source entity and the destination entity involved in the security test.

At step 508, the security model is updated, such as by the network traffic profiler, based on the result of the comparison made in connection with step 506. Such updating of the security model may, for example, be performed using machine learning techniques, such as binary classification, as previously described. It is contemplated that, as previously discussed, the way in which the security model is updated may differ based on the outcome of the comparison in step 506. For example, should a match be made between the actual traffic profile and the expected traffic profile, such techniques may be used to improve the confidence level of an existing attack classification associated with a security model. On the other hand, if the actual traffic profile differs from that of the expected traffic profile, the security model may be updated to add or modify existing attack classifications to match future traffic profiles substantially similar to that which was missed in step 504. Such actions, as previously discussed, may be handled automatically, manually, or in some combination thereof.

Figure 6:
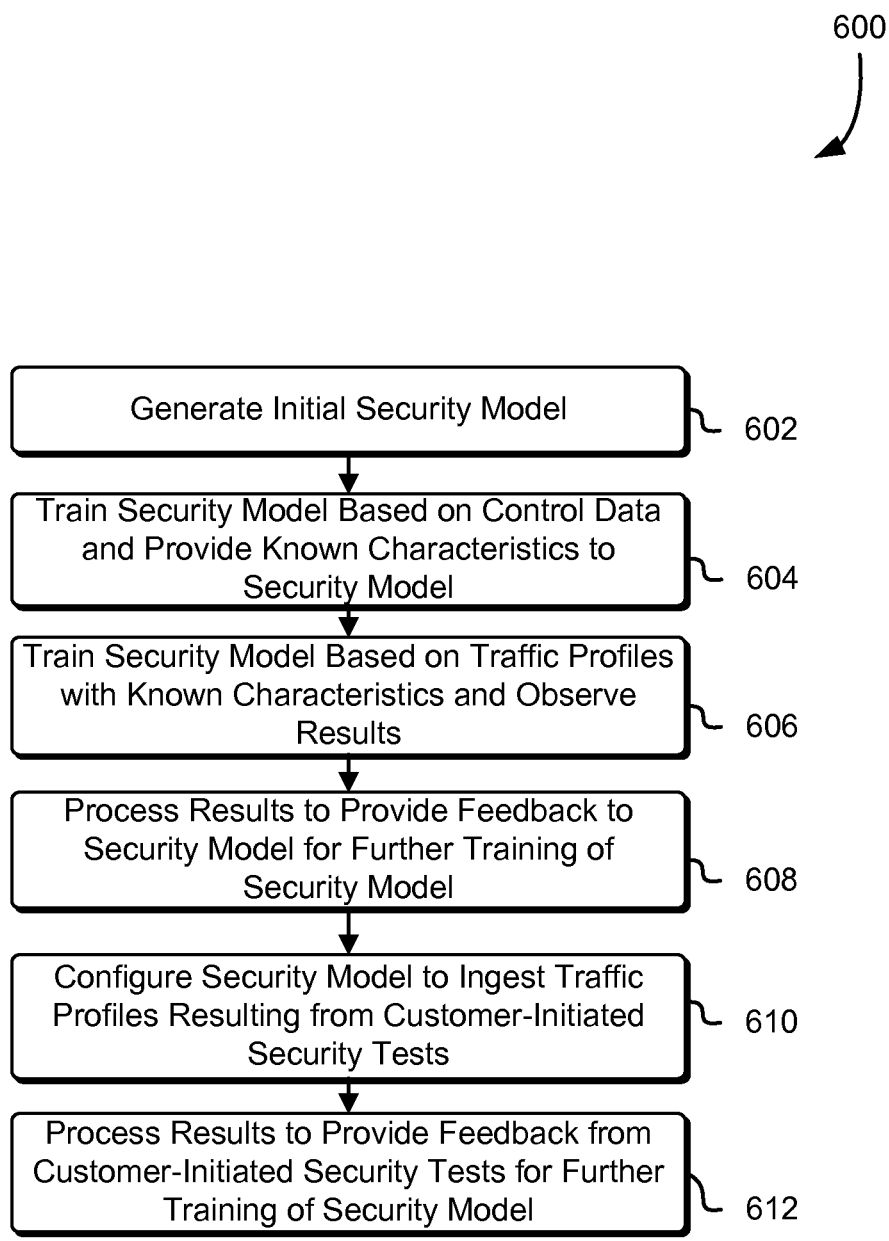
FIG. 6 illustrates an example process for developing and implementing a security model using both internally- and customer-sourced data, in accordance with some embodiments.

FIG. 6 illustrates an example process for developing and implementing a security model using both internally- and client-sourced data, in accordance with some embodiments. Process 600 may be implemented on various resources of a computing resource service provider, and, in some embodiments, may use or be implemented upon a network traffic profiler as described in further detail above. At step 602, an entity, such as a network traffic profiler, generates an initial security model for use in monitoring network traffic. An initial security model may include a basic set of constraints, such as patterns, parameters, and the like known to correlate with an attack (e.g., as a result of prior observation), and may use binary classification techniques, and other supervised learning techniques, to initially analyze and/or process network traffic data.

At step 604 the initial security model generated in step 602 is trained based on control data, and known characteristics (i.e., the control data provided is known to correlate with one or more attack types and/or confidence levels of such attack types) associated with the control data are provided to the security model. For example, various traffic profiles with known characteristics, such as whether or not they may be classified as being associable with a given attack type, are used as training data. Additionally, the actual characteristics of such training data may also be provided to the security model, so as to quickly allow the security model to build correlations therefrom. Such control data may be provided to the security model by providing the control data to, for example, a network traffic profile implementing the security model.

At step 606, the security model is further trained by providing traffic profiles with known characteristics, and, in some embodiments, rather than providing such known characteristics to the security model, the results provided by the security model are observed (e.g., by the network traffic profiler) so as to determine the performance of the security model. Step 606 may be performed by, for example, a network traffic profiler, and may be implemented so as to determine and/or increase the confidence level of various aspects of the security model, such as attack classifications generated in steps 602 and 604. At step 608, the results of step 606 are processed so as to provide feedback to the security model for further training of the security model. For example, the network traffic profiler may process the results to amend, remove, add, or otherwise modify various attack characteristics developed in steps 602 through 606. As previously described, in the scenario where the security model provides a result that matches the known characteristic of a given traffic profile, an associated attack classification may be increased in confidence for subsequent assessments using that attack classification. If there is a mismatch, however, the associated attack classification may be amended to improve its reliability, or a new attack classification may be added so as to provide a match for future traffic profiles similar to that which was missed.

At step 610, the security model is configured, such as by the network traffic profiler, to ingest traffic profiles related to and resulting from customer-initiated security tests described above in connection with at least FIGS. 1 through 5. The security model may be configured in response to receiving a notification, such as from a customer entity, that a security test of a specified type is scheduled to occur. As previously discussed, such security tests may, in some embodiments, be substantially similar to actual malicious network traffic or attacks being simulated by the security tests. As also previously discussed, a notification may include information that helps a network traffic profiler configure the security model to appropriately ingest network traffic and thereby generate traffic profiles therefrom, in accordance with the parameters of the security tests.

At step 612, the results of step 610 are synthesized by the security model, such as via the network traffic profiler, in order to provide further feedback (e.g., for the security model) from the customer-initiated security tests for further training of the security model. Such results may be processed in a similar fashion as described in connection with step 608. For example, attack classifications may be further amended, and the security model further refined, based on feedback developed from the customer-initiated security tests.

Figure 7:
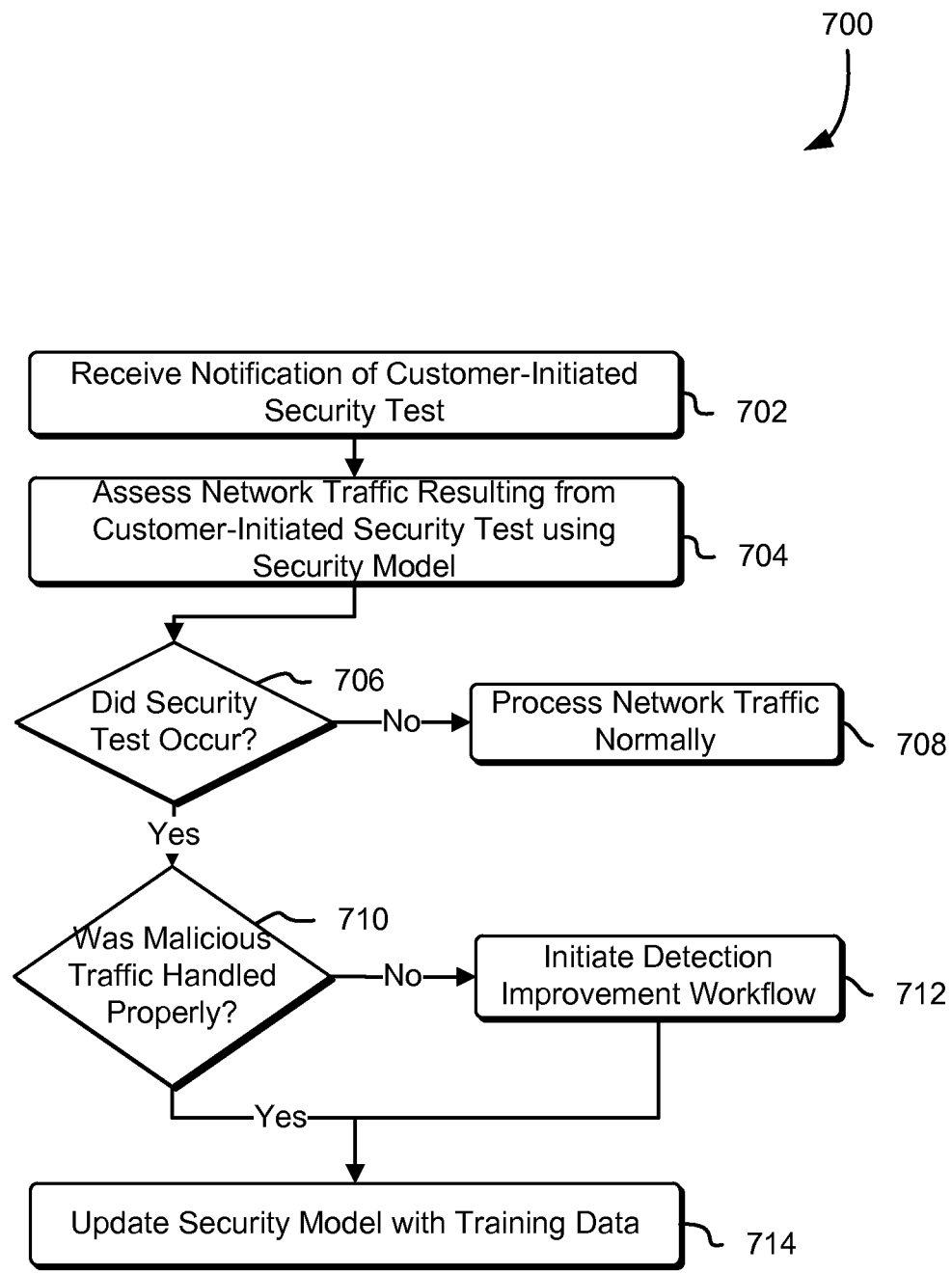
FIG. 7 illustrates an example process for utilizing training data derived from a customer-initiated security tests to update a security model, in accordance with some embodiments.

FIG. 7 illustrates an example process 700 for utilizing training data derived from customer initiated security tests to update a security model, in accordance with some embodiments. At step 702, an entity, such as a component of a computing resource service provider, receives notification of a customer-initiated security test. For example, the notification may be received by a notification service of the computing resource service provider. The notification, in some embodiments, may be received from a customer entity, such as those previously described in this disclosure. The notification may contain various attributes of the security test to be run, in accordance with the disclosure herein. The customer may initiate the security test by using, for example, a customer entity, or, in some embodiments, may cause the security test to be run on one or more entities associated with a computing service resource provider. For example, a customer may, through a customer entity, direct a virtual computer system of the computing resource service provider, to act as a source entity for the security test.

At step 704, a network traffic profiler or other entity assesses network traffic resulting from the customer initiated security test, such as the security test associated with the notification received in step 702, using a security model, such as that associated with the network traffic profiler. At decision point 706, in order to establish a baseline, the entity, such as the network traffic profiler, or, in some embodiments, via a second notification from the customer or the customer entity, assesses whether the scheduled security test actually occurred. Such an assessment may be made based on data associated with the customer or customer entity's previous history of activity. In some embodiments, the activity history of the source entity associated with the security test is used to determine whether the security test is presently occurring, in accordance with the techniques previously described.

If no security test was deemed to have occurred at decision point 706, at step 708, the network traffic profiler proceeds to process any network traffic transiting between the source entity and the destination entity associated with the security test, in the same fashion as if no notification had been received at step 702. However, if the security test is detected to be under way in accordance with the notification received at step 702, a second decision point 710 is reached, wherein the propriety of the handling of simulated malicious traffic arising from the security test is assessed. The assessment at decision point 710 may be conducted in accordance with, for example, machine learning techniques, such as binary classification and other supervised learning techniques, as previously described herein. For example, the traffic profiles assessed with the network traffic being assessed in step 704 may be compared against one or more attack classifications associated with a security model implemented by the network traffic profiler monitoring the network traffic.

If, at decision point 710, the network traffic profiler determines that malicious traffic was improperly handled, or, in some embodiments, no matching attack classification was found for a given traffic profile, at step 712, a detection improvement workflow is initiated. The detection improvement workflow may, in some embodiments, be similar to the detection improvement workflow previously described. For example, the detection improvement workflow may be an automated, manual, or mixed automated and manual process for improving the security model implemented by the network traffic profiler. At step 714, any such changes to the security model are made using the training data derived from the security test. For example, in the case that a detection improvement workflow, such as that initiated at step 712, generates new attack classifications, the security model is updated with such new attack classifications at step 714. However, if, at decision point 710, it is determined that the malicious traffic was handled properly (e.g., determining that the assessed network traffic connected with step 704 was matched to one or more attack classifications), the matching attack classifications may have various parameters associated with confidence statistics increased at step 714.

Figure 8:
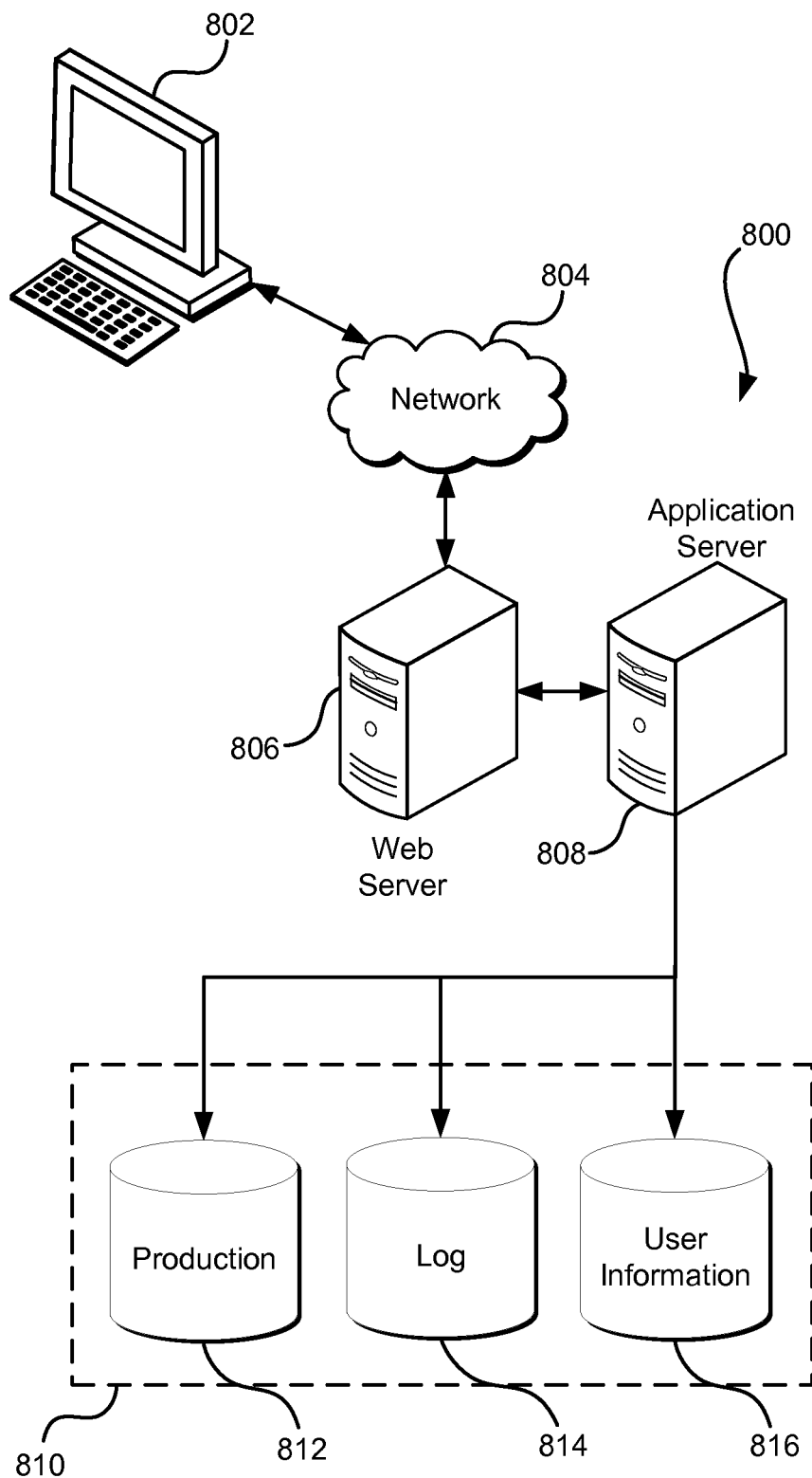
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of Hyper-Text Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising: one or more processors; and
memory including instructions that, as a result of execution by the one or more processors, cause the system to:
  generate a security model that characterizes network data by applying attack classifications;
  determine that a security test is to be performed to a target endpoint by a client device associated with a customer of a computing resource service provider, the target endpoint being a virtual computer system hosted by the computing resource service provider;
  obtain, from the customer via the client device, a plurality of attributes of the security test, wherein the plurality of attributes include a first identifier of the client device, second identifier of the target endpoint, and a length of time specified for performing the security test;
  modify, based at least in part on the plurality of attributes of the security test, the security model to produce a modified security model to be usable in determining traffic profiles from ingestion of network traffic between the client device and the target endpoint;
  determine, based at least in part on the plurality of attributes of the security test and the security model, a subset of the network traffic between the client device and the target endpoint in connection with the security test, the subset of the network traffic conforming to the plurality of attributes of the security test;
  process, by at least utilizing the modified security model, the subset of the network traffic to determine a traffic profile;
  process the traffic profile using the attack classifications to generate training data; and
  update, based at least in part on the training data, the modified security model by at least generating a new attack classification that matches the traffic profile with a higher confidence level than the attack classifications used to generate the training data.

2. The system of claim 1, wherein, the instructions, if executed by the one or more processors, cause the system to further update the security model, based at least in part on the training data, with a confidence level associated with the attack classifications used to generate the training data.

3. The system of claim 1, wherein if the training data indicates that the traffic profile fails to match a subset of the attack classifications, the instructions, if executed by the one or more processors, cause the system to at least:
  determine whether the security test is performed; and
  update the security model so as to improve a detection baseline of the security model.

4. The system of claim 1, wherein the security test simulates a distributed denial of service attack upon the target endpoint.

5. A computer-implemented method, comprising:
  generating a security model that characterizes network data by applying attack classifications;
  obtaining, from a customer of a computing resource service provider via a client device, information relating to a security test between the client device and a virtual computer system, the information including a source identifier that identifies the client device, a target identifier that identifies the virtual computer system, and a duration of the security test, the security test being directed to the virtual computer system from the client device;

configuring, based at least in part on the information relating to the security test, the security model to produce a configured security model to be usable in determining traffic profiles from ingestion of network traffic between the client and the virtual computer system;

monitoring the network traffic between the client device and the virtual computer system in connection with the security test;

using the configured security model to determine a traffic profile for the security test;

comparing the traffic profile to the attack classifications to generate training data; and updating the configured security model using the training data by at least generating a new attack classification that matches the traffic profile with a higher confidence level than the attack classifications used to generate the training data.

6. The computer-implemented method of claim 5, wherein one or more computer systems monitor, during the security test, the network traffic between the client and the virtual computer system for a subset of the network traffic that conforms to one or more attributes.

7. The computer-implemented method of claim 5, further comprising updating the security model, by updating, based at least in part on the training data, a confidence level associated with the attack classifications used to generate the training data.

8. The computer-implemented method of claim 5, further comprising:
   detecting whether the security test is occurring; and
   updating the security model by improving a detection baseline of the security model.

9. The computer-implemented method of claim 8, wherein the detection baseline is improved by using, at least in part, the training data to refine at least a subset of the attack classifications.

10. The computer-implemented method of claim 5, wherein the security test simulates a distributed denial of service attack upon the virtual computer system.

11. The computer-implemented method of claim 5, wherein machine learning techniques are used in conjunction with the training data to update the security model.

12. The computer-implemented method of claim 5, further comprising:
   determining an expected type of traffic between the client device and the virtual computer system based at least in part on other information relating to the client device or the virtual computer system.

13. A non-transitory computer-readable storage medium storing thereon executable instructions that, as a result of execution by one or more processors of a computer system, cause the computer system to at least:
   generate a security model that characterizes network data by applying a plurality of attack classifications;
   obtain, from a customer of a computing resource service provider via a source client, information relating to a security test being performed to a destination client by the source client, the destination client being a virtual computer system of the computing resource service provider, the information including a first identifier corresponding to the source client, a second identifier corresponding to the destination client, and an amount of time for the security test;
   modify, based at least in part on the information, the security model to produce a modified security model to configure the modified security model to be usable in determining traffic profiles from ingestion of network traffic between the source client and the destination client;
   monitor the network traffic between the source client and the destination client in connection with the security test;
   use the modified security model to determine a traffic profile for a portion of time during which the security test between the source client and the destination client is monitored;
   generate training data by assessing the traffic profile against the plurality of attack classifications associated with the modified security model; and
   update the modified security model using the training data by at least generating a new attack classification that matches the traffic profile with a higher confidence level than the plurality of attack classifications used to generate the training data.

14. The non-transitory computer-readable storage medium of claim 13, wherein the information is received from an entity operatively connected to the computer system and includes at least a test type and a duration for the security test.

15. The non-transitory computer-readable storage medium of claim 13, wherein the executable instructions that cause the computer system to monitor the network traffic further cause the computer system to monitor the security test by sampling the network traffic between the source client and the destination client associated with the security test.

16. The non-transitory computer-readable storage medium of claim 13, wherein the source client is operatively connected to the computer system.

17. The non-transitory computer-readable storage medium of claim 15, wherein the source client is a virtual computer system of the computing resource service provider.

18. The non-transitory computer-readable storage medium of claim 13, wherein:
   the executable instructions that cause the computer system to modify the security model using the training data include instructions that cause the computer system to modify the security model by using binary classification techniques; and
   the training data is used input for the binary classification techniques.

19. The non-transitory computer-readable storage medium of claim 13, wherein the security model is a supervised machine learning model.

20. The non-transitory computer-readable storage medium of claim 13, wherein the security test is a penetration test.

* * * * *